Oct. 11, 1955      E. S. HOBSON      2,720,001
FISH DRESSING TOOL
Filed July 30, 1954
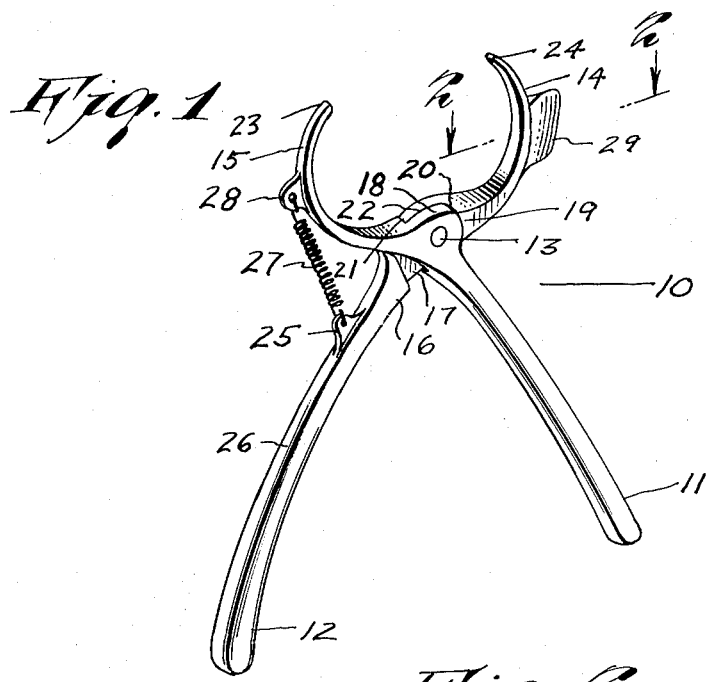
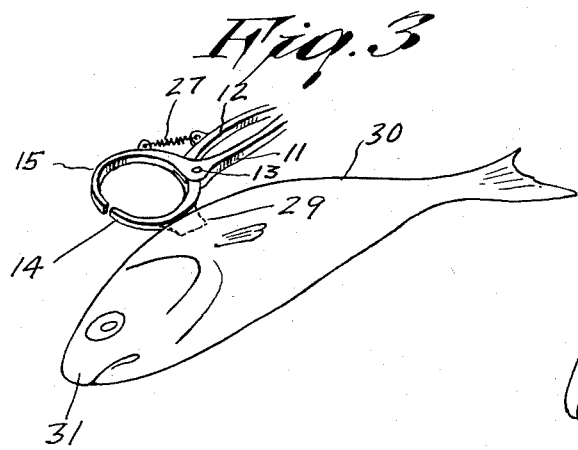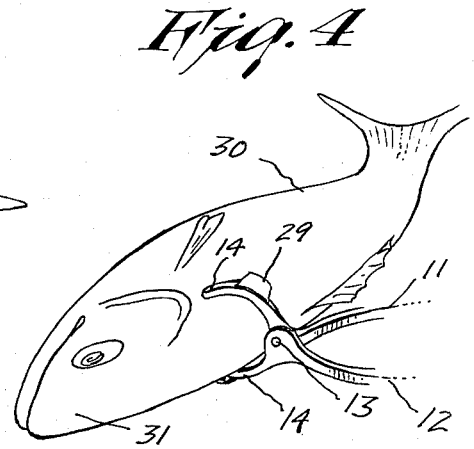
INVENTOR.
ERNEST S. HOBSON
BY
Carl Miller
ATTORNEY United States Patent Office 2,720,001
Patented Oct. 11, 1955

2,720,001

FISH DRESSING TOOL

Ernest S. Hobson, Cleveland, Minn.

Application July 30, 1954, Serial No. 446,887

1 Claim. (Cl. 17—7)

This invention relates to novel and useful improvements in fish dressing tools.

The most objectionable and tedious task faced by the fisherman occurs after a successful fishing operation. To enjoy the fruits of his labor, the catch must be dressed properly; a detail which, when faced with the conventional available tools, mitigates the entire operation. With the conventional apparatus, it is first necessary to puncture and slit the fish skin with a knife which is then followed with a pincer for grasping the loose skin ends and pulling away the skin from the body. It is apparent that very slow progress results from the use of such tools, making the dressing of a sizable haul an objectionable detail. Moreover, a plurality of tools must be transported and accounted for.

In the instant invention, the several operations incidental to fish dressing are combined into one specially adapted integral tool. Consequently, the primary inventive object involves the provision of a pincers especially adapted to encompass the body of ordinary fish, and further provided with means for slitting the fish skin.

A further inventive object comprises a pincers equipped with sharp edges for slitting a fish skin, and so designed to be normally in a position to encompass the body of a fish of average size.

Further objects and inventive details will become apparent from the following description, when taken in conjunction with the attached drawings in which:

Figure 1 is a perspective view, showing the novel fish dressing tool.

Figure 2 is an enlarged sectional view, taken through plane 2—2 of Figure 1.

Figure 3 is a perspective view, showing the tool in use during a slitting operation.

Figure 4 is a perspective view, showing the tool in use during a back-breaking operation.

Referring to Figure 1, the tool 10 is seen to comprise the conventional handles 11 and 12, which are pivoted together by the pin 13 adjacent the pincers 14 and 15. Pincers 14 comprises an arcuate prong-like member extending from the upper end 16 of the handle 12. The heel end 17 of the pincers 14 is offset relative to the handle end 16 to provide space for a similarly recessed heel end 18 of the pincers 15.

The end of recessed portion 17 remote from the handle end 16 intersects an arcuate transverse surface 19 complementary to a similar surface 20 of the pincers end 18, whereby the surface 20 can move about pin 13 in parallel relationship to the surface 19. In similar fashion, pincers end 18 is provided with the recess 21 arcuately shaped to parallel the arcuate surface 22 of the pincers 14. Thus, actuation of handles 12 and 11 causes the pincers 15 and 14 to pivot relative to each other, permitting the fish skin to be grasped by the sharp points 23 and 24.

To maintain the pincers in the open position, a bracket 25 is provided along the outer edge 26 of the handle 12, for the purpose of retaining one end of a tension spring 27, the other end of which is connected to the ear 28 projecting from the outer edge of the pincers 15.

For performing the slitting operation, the knife edge 29 is formed integral with and extending outwardly from the pincers 14 (see Figure 2).

In operation, the operator closes the aperture between the points 23 and 24 by the application of pressure on the handles 11 and 12, placing the knife edge 29 in position for making an incision into the skin of the fish 30. Having made the incision, the pincers 14 and 15 are used to partially strip the skin from the back of the fish to a point about two inches beyond the dorsal fin. A new bite is then taken with the pincers at the fold of the detached skin, and the skin is stripped from the fish all the way through the tail. Referring now to Figure 4, the fish head 31 is held in one hand, and the pincers are applied as shown to break the backbone and then, by exerting a horizontal motion to the rear of the fish, the belly skin is removed from beneath the head, accompanied by the removal of the entrails, bladder and head, leaving only the desirable edible portions.

It is apparent that the entire dressing operation is accomplished in a minimum of steps, greatly reducing the usual effort required. The disclosed tool is compact, very simple to use, and lends itself to economic fabrication from such conventional materials as metals, plastic, etc.

It should further be understood that the numerous species resulting from changes in size, shape, material and the combination of various forms of the disclosed operative elements are contemplated within the inventive scope.

Having thus disclosed the nature of the new and useful improvements in fish dressing tools, what is now claimed as new is as follows:

A fish dressing tool, comprising opposing pincers movable towards and away from each other, means for moving said pincers manually, said pincers being biased to the open position, said pincers being shaped to encompass the body of an average sized fish when in the open position, including a knife edge integrally attached to one of said pincers on the side remote from the other of said pincers, wherein said pincers are biased to open position by means of a tension spring, a bracket on the pincer remote from the knife bearing pincer and a bracket on the handle adjacent said spring, and the latter connecting said brackets.

References Cited in the file of this patent

UNITED STATES PATENTS

| | | |
|---|---|---|
| 265,113 | Loree | Sept. 26, 1882 |
| 590,747 | Tidler | Sept. 28, 1897 |
| 1,459,007 | Wetzig | June 19, 1923 |
| 2,654,120 | Tifft | Oct. 6, 1953 |